United States Patent [19]
Wexell

[11] 4,158,081
[45] Jun. 12, 1979

[54] VITREOUS ENAMEL FLUX AND ENAMEL COATED ARTICLE

[75] Inventor: Dale R. Wexell, Corning, N.Y.

[73] Assignee: Corning Glass Works, Corning, N.Y.

[21] Appl. No.: 949,446

[22] Filed: Oct. 10, 1978

[51] Int. Cl.$^2$ .................. B32B 7/02; B32B 17/06; C03C 5/02

[52] U.S. Cl. .................. 428/212; 106/49; 106/53; 428/427; 428/428

[58] Field of Search .................. 106/49, 53; 428/427, 428/428, 212

[56] References Cited

U.S. PATENT DOCUMENTS 4,038,448   7/1977   Boyd et al. .................. 106/49

Primary Examiner—O. R. Vertiz
Assistant Examiner—Mark Bell
Attorney, Agent, or Firm—Clinton S. Janes, Jr.

[57] ABSTRACT

There is disclosed a glass or glass-ceramic body with a coefficient of thermal expansion below $40 \times 10^{-7}/°$ C. and having an adherent, high gloss enamel fired on at least a portion of the external surface of the body, the enamel flux being composed, in percent by weight on a calculated oxide basis, of 25–40% $SiO_2$, 40–60% PbO, at least 75% PbO+$SiO_2$, 3–10% $ZrO_2$, 4–12% $B_2O_3$, and 0.2–2.0% $Li_2O$, being free of $TiO_2$, optionally containing up to 2% $Na_2O+K_2O$ and up to 4% CdO, having a coefficient of thermal expansion of $48–70 \times 10^{-7}/°$ C., a softening point below 660° C. and low lead and cadmium release values under either acid or alkaline conditions.

12 Claims, No Drawings

VITREOUS ENAMEL FLUX AND ENAMEL COATED ARTICLE

BACKGROUND OF THE INVENTION

The invention concerns a glass or glass-ceramic body with a coefficient of thermal expansion below about $40 \times 10^{-7}/°C.$, and having an adherent, high gloss enamel fired on its surface. The invention further concerns a system of enamel fluxes particularly adapted to producing the enamel coated article.

Heat resistant, borosilicate glassware, having a relatively low thermal coefficient of expansion on the order of $30$-$40 \times 10^{-7}/°C.$, was developed and introduced commercially about 1915. See U.S. Pat. Nos. 1,304,622-3 granted May 27, 1919 to E. C. Sullivan and W. C. Taylor. Borosilicate glasses have found particular application in laboratory ware and baking ware, and such glassware is known and used worldwide today.

In spite of the long and widespread popularity such glassware has enjoyed, no satisfactory enamel has been available for firing on borosilicate glass surfaces. Accordingly, borosilicate baking ware has been marketed as a clear glass product, that is undecorated, over the years. Where markings became absolutely essential on borosilicate glassware, for example on measures or volumetric ware, efforts have been made to develop ion exchange stains as a color medium.

Previous difficulties in decorating borosilicate ovenware centered about an inability to fire a chemically durable enamel on the surface of an article without distorting the article shape. For example, a widely used borosilicate glass of commerce, Code 7740 glass from Corning Glass Works, has a thermal coefficient of expansion of $32.5 \times 10^{-7}/°C.$ This renders the glass resistant to thermal shock, but limits the choice of compatible enamel fluxes. Further, this glass has a strain point of 510° C. Consequently, warpage tends to occur if an article molded from the glass is maintained at a temperature about 660° C. for any length of time. Therefore, it has proven extremely difficult to develop a chemically durable enamel flux that can be properly fired on such glassware.

The chemical durability of a glass or glass-ceramic surface is usually considered in terms of material loss per unit surface on exposure to a certain environment, e.g. water, or a specified acid or alkaline solution. However, in the case of glassware used in food preparation, e.g. baking ware, the more important consideration usually is toxic metal release. Of particular concern are lead and cadmium metal release values, these toxic metals being present in many decorating enamels as vitreous constituents and/or pigment additions.

In recognition of the potential danger from excessive toxic metal release, the Food and Drug Administration (FDA), in its Compliance Guidance Manual issued June 13, 1974, has established maximum limits which lead and/or cadmium release from an enameled surface must not exceed. In the prescribed FDA test, an enameled surface is exposed for 24 hours to 4% acetic acid at room temperature (22°±20°C.). A sample of the acid solution is then tested for absorbance in an atomic absorption spectroscope and the observed value converted to a metal concentration value on a standard curve, the metal being reported in parts per million (PPM). The reported value is based on the inside volume of a hollow article having an enamel coated or decorated inner surface and filled to a specified level with acetic acid for the test. In order to comply with FDA requirements, lead release from a food contacting surface, that is, for example, the inside of a dish in which food is prepared, served, or stored, must not exceed 7 parts per million (ppm) and cadmium release correspondingly must not exceed 0.5 ppm.

A similar test has been devised for use on exterior surfaces of a vessel or dish. Here, however, the maximum limits of metal release are somewhat higher, since there normally is no direct exposure of such surface during baking or other food preparation. Thus, the permitted metal release limits for exterior surfaces, in terms of micrograms/cm.[2] are 50 units of lead and 5 units of cadmium. It is of course desirable to employ enamels with much lower release values at any time during product life.

While the FDA standards are based on acid reaction on a freshly produced article, it is well known that alkaline solutions may be even more detrimental to a glass-or glass ceramic surface. Accordingly, a test has been devised in which weighed and measured samples of enameled glass are immersed in a 0.3% by weight aqueous solution of an alkaline detergent marketed by Economics Laboratories, St. Paul, Minn., under the mark Super Soilax. The solution is maintained at 95° C. for 24 hours, after which the samples are removed, rinsed, dried, and weight loss determined. The loss may be based on the enamel, per se, or may be reported as lead and/or cadmium release values for comparison with FDA standards. The time of 24 hours represents an accelerated equivalent to the anticipated exposure of a dish to such conditions during its expected lifetime.

Presently, glass-ceramic materials, that is, materials developed by nucleated internal crystallization of certain glasses, are of great interest. See U.S. Pat. No. 2,920,971, granted Jan. 12, 1960 to S. D. Stookey, for a full discussion of glass-ceramic materials and their production. In particular, certain $Li_2O$—$Al_2O_3$—$SiO_2$ glass-ceramics, having a stoichiometry such that a beta-spodumene crystal phase is developed, have a very low coefficient of thermal expansion on the order of 10 to $15 \times 10^{-7}/°C.$ Accordingly, this type of glass-ceramic has found wide application in cooking ware and rangetops.

The decoration of such glass-ceramic articles is much less of a problem because the ware can be fired at considerably higher temperatures without danger of distortion. However, such higher firing temperatures involve markedly increased energy consumption. Accordingly, a drive has been under way, recently, to minimize, as far as possible, the firing temperature required in providing a high gloss, low toxic metal release enamel on glass-ceramic ware.

PRIOR ART

U.S. Pat. No. 4,038,448, granted July 26, 1977 in the name of Boyd et al., discloses enamels for use in decorating dense opal glasses having thermal coefficients of expansion in the range of $66$-$75 \times 10^{-7}/°C.$ The flux compositions for these enamels are essentially free from alkali metal oxides other than lithia and are in the $Li_2O$—$B_2O_3$—$TiO_2$—$ZrO_2$—$PbO$—$SiO_2$ system. The enamels are characterized by low lead and cadmium release values when exposed to chemical attack.

The Boyd et al. patent, just mentioned, sets forth an extensive review of potentially relevant prior enamel art. Such review is incorporated herein by reference to avoid repetition.

In addition, Example B of U.S. Pat. No. 3,418,156, discloses a $Li_2O-B_2O_3-ZrO_2-PbO-Al_2O_3-SiO_2$ enamel flux containing 0.2% $TiO_2$ and characterized by relatively large contents of $B_2O_3$ and $ZrO_2$. Also, U.S. Pat. No. 3,498,804, discloses, in Example 1 thereof, a glaze that is free of $TiO_2$, but has relatively high contents of $B_2O_3$ and $SiO_2$ with relatively low content of PbO. This glaze is designed for use on refractory castables such as fused silica cement.

PURPOSE OF THE INVENTION

One purpose is to provide a flux for an enamel that can be fired to a high gloss on a borosilicate glass surface at a temperature below 660° C.

A further purpose is to provide a chemically durable enamel having lead and cadmium release values that are substantially lower than FDA standards for the external surfaces of food preparation dishes.

Another purpose is to provide an enamel flux that can be fired on a low expansion glass-ceramic surface at a temperature below 750° C., while providing the chemically durable characteristics referred to above.

A further purpose is to provide enamel decorated glass of glass-ceramic articles which are characterized by low toxic metal release values making them suitable for food preparation purposes.

A particular purpose is to provide modified enamel fluxes of the type generally described in U.S. Pat. No. 4,038,448, such modified enamel fluxes being suitable for the purposes described above. A more specific purpose is to provide such enamel fluxes having compositions which are free of titanium oxide.

SUMMARY OF THE INVENTION

The enamel flux of the invention has a coefficient of thermal expansion in the range of $48-70\times10^{-7}/°C.$, a softening point below 660° C., preferably below 600° C., and lead and cadmium metal release values below the standards set by FDA. In terms of chemical composition, it consists essentially of 25-40% $SiO_2$, 40-60% PbO, at least 75% $PbO+SiO_2$, 3-10% $ZrO_2$, 4-12% $B_2O_3$ and 0.02-2.0% $Li_2O$, is free of titania and optionally contains up to 2% $Na_2O+K_2O$ and up to 4% CdO. The invention further contemplates an article composed of a glass or glass-ceramic body having a coefficient of thermal expansion below $40\times10^{-7}/°C.$ and an adherent, high gloss enamel, embodying a flux as heretofore described, fired on the surface of the glass or glass-ceramic body.

GENERAL DESCRIPTION OF THE INVENTION

The enamels of the present invention have been specifically formulated for use on a commercial borosilicate glass of the type disclosed in the Sullivan-Taylor United States Patents mentioned earlier. The specific commercial glass, Code 7740, has a softening point of 821° C., a strain point of 510° C., a coefficient of thermal expansion of $32.5\times10^{-7}/°C.$, and the following approximate composition in parts by weight:

| Code 7740 | |
|---|---|
| $SiO_2$ | 80.5 |
| $B_2O_3$ | 12.9 |
| $Al_2O_3$ | 2.2 |
| $Na_2O$ | 3.8 |
| $K_2O$ | 0.4 |

While the present enamel fluxes have been particularly designed for a given glass, it will be readily apparent to one of ordinary skill in the art that they may find general application on articles molded from borosilicate glasses having expansions on the order of $40\times10^{-7}/°C.$ or less. They have further found application as adherent, high gloss coatings on glass-ceramic cookware, the firing temperature for such coatings being below 750° C. As explained earlier, this relatively low firing temperature represents a considerable energy savings while proving the requisite decorative appearance and low toxic metal release on exposure to acid or alkaline solutions. One such glass-ceramic material, Code 9608 presently employed by Corning Glass Works for the commercial production of cookware, has a predominantly beta-spodumene crystal phase, a thermal coefficient of expansion of about $12\times10^{-7}/°C.$ and is composed, approximately, in parts by weight of:

| Code 9608 | |
|---|---|
| $SiO_2$ | 69.5 |
| $Al_2O_3$ | 17.6 |
| $Li_2O$ | 2.7 |
| MgO | 2.6 |
| ZnO | 1.0 |
| $TiO_2$ | 4.7 |
| $ZrO_2$ | 0.2 |
| $As_2O_3$ | 0.9 |
| F | 0.03 |
| $Fe_2O_3$ | 0.06 |
| $B_2O_3$ | 0.07 |
| $MnO_2$ | 0.03 |

In the decorating or coating process, one or more milled enamels are applied over a selected portion of a glass or glass-ceramic surface, either through the medium of an organic vehicle or as a preform decal pattern or the like. In any case, the softening point of the enamel flux must be well below that of the glass or glass-ceramic substrate to permit adequate softening and flow of the flux without deformation of the substrate. For glass articles, this normally entails a firing cycle which is not over 10 minutes in length and wherein the maximum temperature is not over 150° C. above the strain point of the glass or glass-ceramic substrate.

Traditionally, enamel fluxes have had a large content of lead oxide (PbO) to provide a low softening point and to induce a low modulus of elasticity which imparts a condition known as "stretching" capability. This latter property is essential to producing a smooth, craze-free coating on a glass or glass-ceramic surface.

Lead oxide, and to a lesser extent cadmium oxide (CdO), also impart a high gloss or brilliancy to a fired enamel as a result of their high indices of refraction. Where an enamel contains a cadmium-bearing pigment, CdO must be in the enamel flux to impart a solubilizing action, and thereby provide proper color development in the fired enamel.

Boric oxide ($B_2O_3$) generates a strong solvent action on the other components, reduces the coefficient of thermal expansion, inhibits devitrification when present in low concentrations, and reduces surface tension in the enamel during firing. However, as the $B_2O_3$ content is increased, durability is reduced and there is a tendency for phase separation and opalization to occur in the flux, particularly if lithia or zirconia are at a relatively high level. Preferably, the $B_2O_3$ content is in the range of 6-10%.

The single required alkali metal oxide component is lithia (Li$_2$O), but the contents of this oxide must not exceed about 2 wt.%. Otherwise opalization and/or devitrification of the glass tend to occur, particularly at relatively high zirconia levels. A feature of the present invention is the optional presence of soda (Na$_2$O) and/or potash (K$_2$O) in amounts up to about 2%. These alkali metal oxides, like lithia, greatly increase the fluidity of the enamel during firing, and thereby increase the gloss of the fired product. However, their total content must not exceed 2% in order to obtain the desired chemical durability and consequent low toxic metal release, and to prevent an excessively large coefficient of expansion. Fluxes containing K$_2$O, rather than Na$_2$O, have better acid and alkali durability, but also tend to have higher softening points.

A particular feature of the present enamel flux system is the use of zirconia (ZrO$_2$) to obtain excellent resistance to alkali attack and to achieve lead and cadmium release values well below those prescribed by the FDA. It is believed that inclusion of ZrO$_2$ in the glass structure acts to densify the structure by promoting cross-linking and substantially reducing the number of unbonded oxygen atoms therein. This effect of densified glass structure was discussed in the Boyd et al. patent, mentioned earlier, but that patent specified, as a critical feature, that both TiO$_2$ and ZrO$_2$ must be present in its inventive enamels to achieve the effect.

decrease the softening point of the previous enamels by 50° C. or more, while maintaining the coefficient of expansion at about the same value.

It is well known in the art that pigment materials are normally included in decorative enamels to provide color and/or opacity. Inasmuch as the present invention is concerned with the flux component of an enamel, rather than the pigment addition, no further mention is made of the latter, except to say that any of the known pigments may be employed with the present enamel fluxes in the usual manner and amount to produce the customary effects. As noted above, CdO should be included in the flux when a cadmium-bearing pigment is being employed.

SPECIFIC EMBODIMENTS OF THE INVENTION

Table I records a number of enamel flux compositions, expressed in parts by weight on the oxide basis, illustrating the enamel fluxes of the present invention. Because the sum of the individual components totals approximately 100, the tabulated values can reasonably be considered to be reported in terms of weight percent as calculated from the batch on an oxide basis.

Table I further sets forth the coefficient of thermal expansion ($\times 10^{-7}$/° C. over the range of 0°–300° C.) and the softening point (in °C.) of enamel fluxes having the reported batch compositions.

TABLE I

| | 1 | 2 | 3 | 4 | 5 | 6 | 7 | 8 | 9 | 10 |
|---|---|---|---|---|---|---|---|---|---|---|
| PbO | 52.6 | 58.3 | 50.7 | 56.8 | 49.7 | 52.0 | 47.1 | 45.5 | 42.3 | 42.1 |
| SiO$_2$ | 31.1 | 25.4 | 30.6 | 26.3 | 30.9 | 26.3 | 35.6 | 36.8 | 39.3 | 37.3 |
| B$_2$O$_3$ | 7.4 | 7.6 | 8.5 | 7.8 | 8.6 | 7.8 | 7.8 | 8.0 | 8.2 | 10.5 |
| ZrO$_2$ | 6.1 | 6.4 | 7.1 | 6.6 | 7.2 | 6.6 | 6.6 | 6.6 | 6.9 | 6.8 |
| CdO | 2.1 | 2.0 | 2.2 | 2.1 | 2.4 | 2.1 | — | 2.2 | 2.3 | 2.3 |
| Li$_2$O | 0.9 | 0.3 | 0.9 | 0.5 | 1.3 | 0.9 | 0.9 | 1.0 | 1.0 | 1.0 |
| S.P. (°C.) | 565 | 545 | 588 | 565 | 581 | 642 | 575 | 654 | Cryst. | Cryst. |
| Expansion: ($\times 10^{-7}$/°X.) | 63.0 | 69.0 | 58.3 | 63.7 | 60.5 | Cryst. | 56.6 | 51.1 | 48.5 | 49.4 |

| | 11 | 12 | 13 | 14 | 15 | 16 | 17 | 18 | 19 | 20 |
|---|---|---|---|---|---|---|---|---|---|---|
| PbO | 51.6 | 51.5 | 52.2 | 52.0 | 51.2 | 54.3 | 50.8 | 51.5 | 52.4 | 46.8 |
| SiO$_2$ | 31.6 | 31.4 | 31.8 | 30.0 | 30.0 | 32.5 | 27.0 | 33.0 | 30.9 | 31.0 |
| B$_2$O$_3$ | 6.9 | 7.0 | 7.0 | 7.5 | 8.0 | 4.1 | 7.5 | 5.0 | 7.3 | 9.1 |
| ZrO$_2$ | 6.5 | 6.2 | 6.5 | 6.3 | 7.1 | 6.3 | 9.8 | 6.5 | 3.8 | 6.5 |
| CdO | 1.3 | 1.5 | — | 3.5 | 1.8 | 2.0 | 1.8 | 2.0 | 2.0 | 2.1 |
| Li$_2$O | 0.5 | 0.9 | 1.0 | 0.8 | 2.0 | 0.9 | 1.3 | 1.0 | 0.9 | 0.9 |
| SnO$_2$ | — | — | — | — | — | — | — | — | 2.8 | — |
| ZnO | — | — | — | — | — | — | — | — | — | 1.7 |
| Na$_2$O | 1.6 | 1.5 | 1.5 | — | — | — | 2.0 | 1.0 | — | — |
| S.P. (°C.) | 586 | 611 | 625 | 593 | 566 | 572 | 607 | 604 | 537 | 571 |
| Expansion: ($\times 10^{-7}$/°C.) | 61.0 | 56.2 | 56.5 | 56.4 | 64.6 | 65.1 | 62.5 | 60.2 | 68.8 | 56.7 |

Note: Cryst. means that the value could not be determined because the flux started to crystallize or devitrify in the flame working process.

A particular feature of the present enamels then is the freedom from titania, based on my discovery that the requisite durability and low metal release for present purposes can be attained with zirconia alone. It is further based on my discovery that the softening point of the present enamels can be substantially lowered, without substantial change in expansion coefficient, by substituting B$_2$O$_3$ for TiO$_2$. More particularly, a statistical analysis showed that, in the present composition system, that is within the range of 1–5% TiO$_2$, a substitution of 0.95% SiO$_2$ for TiO$_2$ decreased the softening point of the flux by 10° C. Likewise, a similar analysis, wherein B$_2$O$_3$ was substituted for SiO$_2$ within the range of 4–12% B$_2$O$_3$, showed that an increase of 0.6% in B$_2$O$_3$ content decreased the softening point by 10° C. Thus, an omission of TiO$_2$, coupled with increase in B$_2$O$_3$, can In producing batches for melting the present fluxes, and more specifically those illustrated in Table I, suitable ingredients, either as the indicated oxides or as compounds convertible thereto on melting, are mixed in the indicated proportions. Because of the low alkali metal oxide content in these fluxes, they are generally difficult to melt. Hence, the batches are customarily ball milled to facilitate dissolution of the batch components during melting, particularly the zirconium oxide source. With high concentrations of ZrO$_2$ in the flux, it may even be necessary to remelt the flux in order to obtain a homogeneous stone-free material.

Batches based on the compositions of Table I were prepared as described and melted in electric furnaces at 1300–1450° C. for 3 to 5 hours in platinum crucibles. The presence of any reduced lead in a melt is highly detrimental to a platinum crucible. Accordingly, an oxidizing atmosphere was insured by adding a quantity of ammonium nitrate equal to about 2–3% of the total batch. This additive may be reduced accordingly if other batch materials are added as nitrates.

Each melt was quenched in water or poured through water cooled rollers to facilitate subsequent crushing and milling. For enamel preparation and testing, the crushed glasses were passed through a No. 325 (44 microns) U.S. Standard Sieve. Also, prior to pouring a melt, a sample was drawn in the form of a cane having a diameter of about 0.25 in. in diameter, such cane being used in measuring the thermal expansion coefficient of the flux material.

Red and blue decorating enamels were prepared by mixing standard decorating pigment materials with a flux having the composition of Example 1 in Table I. The mixtures produced were composed, in parts by weight, as follows:

| Red | Blue |
|---|---|
| cadmium sulfoselenide | 6 cobalt-chromium oxide pigment |
| 95 flux | 94 flux |

Each of these mixtures was ball milled to obtain a homogeneous mixture passing through a 325 mesh (44 microns) screen. The milled mixtures were further combined with a standard screening vehicle for application by silk screening onto the external surface of bowls pressed from the Code 7740 glass described earlier. The enameled bowls were fired on a 7½ minute schedule with a maximum temperature of 655° C., and then cooled.

A sample was taken from each bowl for testing in accordance with the acetic acid test prescribed by the FDA for external surfaces of food preparation dishes. A second sample of each bowl was subjected to the 24 hour Super Soilax alkaline detergent test, described earlier.

Following these tests, it was observed that the general appearance of the samples, including color and glass, was satisfactory. The bowl samples were then weighted to determine weight loss. These determinations were converted to lead and cadmium release values in micrograms per square centimeter of surface ($\mu$g./cm.$^2$) as follows:

| Enamel | Test | Pb | Cd |
|---|---|---|---|
| Red | FDA | 3.5 | 0.66 |
| Blue | FDA | 8.6 | 0.10 |
| Red | AD | 5.2 | 1.33 |
| Blue | AD | 5.7 | 0.19 |
| Standard | FDA | 50.0 | 5.0 |

AD = alkaline detergent

Enamel fluxes corresponding to the compositions of Table I, with the exception of composition 20, will pass FDA external surface standards, provided an enamel embodying the flux is fired on a schedule properly related to the flux viscosity and softening point in customary manner. It will be appreciated, of course, that the present enamel fluxes may be used for purposes other than culinary ware, in which case the metal release and durability characteristics may be of less concern.

In general, optimum viscosity and thermal characteristics, as well as durability values, are obtained with fluxes chemically composed of 25–35% $SiO_2$, 45–55% PbO, $SiO_2$+PbO totaling at least 80%, 6–10% $B_2O_3$, 6–8% $ZrO_2$, 0.5–1.5% $Li_2O$, $Na_2O$+$K_2O$ not over 2%, CdO not over 4% and free of $TiO_2$.

I claim:

1. An enamel coated article comprising a glass or glass-ceramic body with a coefficient of thermal expansion below about $40\times10^{-7}$/°C. and having an adherent, high gloss enamel fired on at least a portion of the body's external surface, the enamel flux having a coefficient of thermal expansion in the range of $48-70\times10^{-7}$/°C., a softening point below 660° C., lead and cadmium release values below FDA standrds and a chemical composition consisting essentially of, in percent by weight as calculated from the bath on an oxide basis, 25–40% $SiO_2$, 40–60% PbO, at least 75% PbO+$SiO_2$, 3–10% $ZrO_2$, 4–12% $B_2O_3$ and 0.2–2.0% $Li_2O$, optionally containing up to 2% $Na_2O$+$K_2O$ and up to 4% CdO, and being free of $TiO_2$.

2. An enamel coated article in accordance with claim 1 wherein the softening point of the enamel flux is below 600° C.

3. An enamel coated article in accordance with claim 1 wherein the $B_2O_3$ content of the enamel flux is 6–10%.

4. An enamel coated article in accordance with claim 1 wherein the $ZrO_2$ content of the enamel flux is 6–8%.

5. An enamel coated article in accordance with claim 1 wherein the enamel flux consists essentially of 25–35% $SiO_2$, 45–55% PbO, at least 80% $SiO_2$+PbO, 6–8% $ZrO_2$, 6–10% $B_2O_3$, 0.5–1.5% $Li_2O$, $Na_2O$+$k_2O$ not exceeding 2%, CdO not exceeding 4%, and being free of $TiO_2$.

6. An enamel coated article in accordance with claim 1 wherein the body is composed of a borosilicate glass.

7. An enamel coated article in accordance with claim 1 wherein the body is composed of a glass-ceramic having a predominantly beta-spodumene crystal phase.

8. An enamel flux consisting essentially of, in percent by weight as calculated from the batch on an oxide basis, 25–40% $SiO_2$, 40–60% PbO, at least 75% PbO+$SiO_2$, 3–10% $ZrO_2$, 4–12% $B_2O_3$, and 0.2–2.0% $Li_2O$, optionally containing up to 2% $Na_2O$+$K_2O$ and up to 4% CdO, and being free of $TiO_2$, said flux having a coefficient of thermal expansion of $48-70\times10^{-7}$/°C., a softening point below 660° C. and lead and cadmium release values below FDA standards.

9. An enamel flux in accordance with claim 6 wherein the softening point is below 600° C.

10. An enamel flux in accordance with claim 6 wherein the $B_2O_3$ content is 6–10%.

11. An enamel flux in accordance with claim 6 wherein the $ZrO_2$ content is 6–8%.

12. An enamel flux in accordance with claim 6 consisting essentially of 25–35% $SiO_2$, 45–55% PbO, at least 80% PbO+$SiO_2$, 6–8% $ZrO_2$, 6–10% $B_2O_3$, 0.5–1.5% $Li_2O$, $Na_2O$+$K_2O$ not exceeding 2%, CdO not exceeding 4% and being free of $TiO_2$.

* * * * *

UNITED STATES PATENT AND TRADEMARK OFFICE
CERTIFICATE OF CORRECTION

PATENT NO. : 4,158,081
DATED : June 12, 1979
INVENTOR(S) : Dale R. Wexell

It is certified that error appears in the above-identified patent and that said Letters Patent are hereby corrected as shown below:

Column 1, line 61, change "±20°C." to --±2°C.--.

Column 2, line 20, change "glass-or glass ceramic" to --glass or glass-ceramic--.

Column 3, line 24, change "of" to --or--.

Column 3, line 42, change "0.02" to --0.2--.

Column 4, line 11, change "proving" to --providing--.

Column 6, line 37, change "(°C." to --(°C.)--.

Column 6, line 39, change "X" to --C--.

Column 7, line 47, change "weighted" to --weighed--.

Column 8, line 18, change "standrds" to --standards--.

Signed and Sealed this

Sixteenth Day of October 1979

[SEAL]

Attest:

RUTH C. MASON
Attesting Officer

LUTRELLE F. PARKER
Acting Commissioner of Patents and Trademarks